US005520365A

United States Patent [19]

Gurnig

[11] Patent Number: 5,520,365

[45] Date of Patent: May 28, 1996

[54] METHOD FOR TEMPORARILY SUPPORTING ENGINE HEADS AND HEAD SUPPORT MEANS

[75] Inventor: John R. Gurnig, River Grove, Ill.

[73] Assignee: Fel-Pro Incorporated, Skokie, Ill.

[21] Appl. No.: 324,354

[22] Filed: Oct. 17, 1994

[51] Int. Cl.[6] .......... F16M 3/00

[52] U.S. Cl. .......... 248/688; 248/677

[58] Field of Search .......... 248/688, 673, 248/674, 675, 676, 677, 556, 619, 201; 211/70.6

[56] References Cited

U.S. PATENT DOCUMENTS 1,960,370 5/1934 Cassese .......... 211/33

5,169,115 12/1992 Chung hsiang .......... 248/677

OTHER PUBLICATIONS

The Eastwood Company catalog, cover and p. 112; 1993.

Pem Bulletin SSA–994.

*Primary Examiner*—Ramon O. Ramirez

*Attorney, Agent, or Firm*—Laff, Whitesel, Conte & Saret, Ltd.

[57] ABSTRACT

An integrally molded engine block head support member having a retainer portion insertable into a bolt hole of an engine head and a foot portion which bears against the engine head block confronting surface to temporarily support the head so as to prevent damage to it. A method of using a plurality of such support members is also described.

6 Claims, 1 Drawing Sheet

METHOD FOR TEMPORARILY SUPPORTING ENGINE HEADS AND HEAD SUPPORT MEANS

BACKGROUND OF THE INVENTION

When the head of an internal combustion engine is removed from the block to be temporarily laid aside or stored, it is important to protect the head block-side surface from damage. For overhead cam engines, it is also important to protect any outwardly projecting valve parts from damage which might occur if the head was simply positioned on a bench or against other objects which might bend or deform the valve parts.

At present, head stands are available for supporting heads with their bottom or block-side surfaces elevated above the surface of a supporting bench or other supporting surface. Available metal head stands for this purpose are generally of an inverted T-shape in configuration, and the legs of the T's are proportioned to be inserted in bolt holes to support the head. These head stands are bulky and the portions inserted into the bolt holes could damage the bolt holes.

Accordingly, it would be of advantage to provide an improved temporary support system for protecting the block-side surface of a head during refurbishing of an engine assembly, and especially to inexpensive and disposable supports for use with an engine head.

SUMMARY OF THE INVENTION

In accordance with the present invention improved disposable head supports which are releasably retained by an internal combustion head and a method of using same are provided. The method of temporarily supporting an internal combustion head defining a plurality of bolt holes to prevent damage to its block confronting surface comprises the steps of providing a plurality of engine head support members, each head support member comprising a foot and a retainer, the foot having a base and an upper surface and a length between them of at least about one inch, the upper surface being of a size which is substantially greater than the diameter of the bolt holes, the support member retainer projecting upwardly from the foot upper surface and comprising a plurality of deflectable fingers which flare upwardly and outwardly from a base dimension less than that the diameter of the bolt holes to a major outer dimension which is greater than the diameter of the bolt holes and which then reduces in size upwardly and inwardly therefrom to an upper reduced dimension portion which is less than the diameter of the bolt holes, inserting the upper reduced dimension portions of a plurality of the support members into a plurality of the bolt holes and forcing them inwardly thereof until each foot upper surface engages an adjacent block confronting surface of the engine head around the bolt holes, whereby the support-members are firmly secured to and retained by the bolt holes, and then positioning the support members on a support surface to stably support the block confronting surface spaced away from the support surface. In a preferred form each support member is integrally molded, and the fingers of each taper and merge upwardly into a crown to form the upper reduced dimension portion. Desirably, the support members are non-metallic and the feet are generally cylindrical in external configuration. The invention also contemplates the provision of engine head support members as described for use in the method of temporarily supporting the head.

Further objects features and advantages of the present invention will become apparent from the following description and drawings.

DETAILED DESCRIPTION

Figure 1:
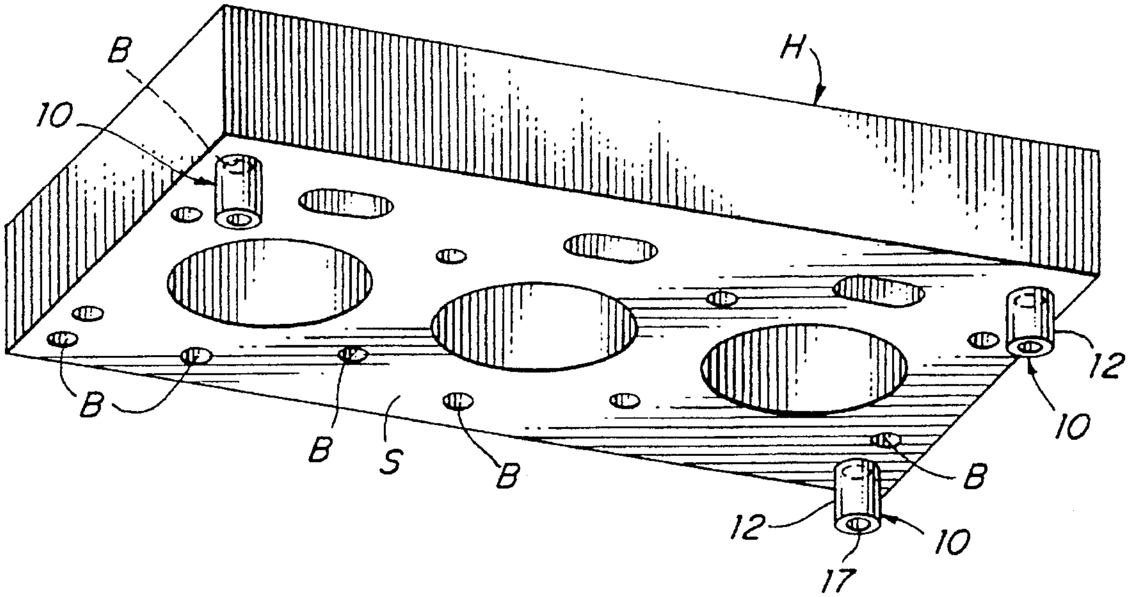
FIG. 1 is a bottom perspective view of a representational internal combustion engine head with a plurality of head support members inserted in bolt holes thereof.
Figure 2:
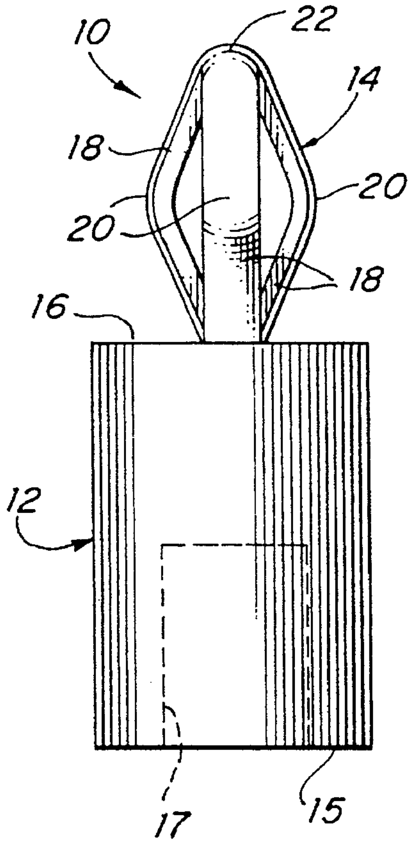
FIG. 2 is a side elevational view of a head support member of the present invention.
Figure 3:
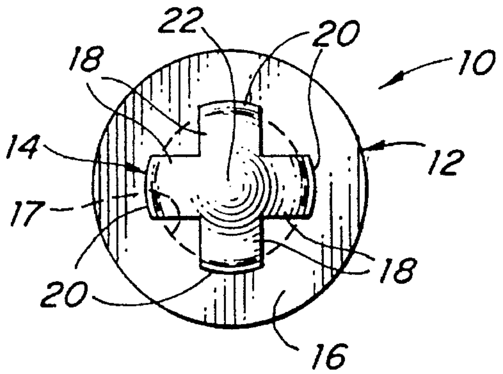
FIG. 3 is a plan view of the head support member of FIG. 2.

Referring now to the drawings, a representational internal combustion engine head H having a series of bolt holes B is adapted to be supported on a work bench or other surface (such as on another head) by a plurality of engine head support members 10. Each head support member 10 comprises a support foot 12 and a specially configured retainer 14.

Foot 12 may be cylindrical in configuration and is of a diameter which is substantially greater than the diameter of the bolt hole B. Typical bolt holes range from about 0.44 to about 0.51 inch and therefore the diameter of the foot 14 is at least about 0.75 inch, and most desirably about 1 inch in diameter. The upper surface 16 of foot 12 serves to supportingly engage the head H. To provide sufficient stand-off of the block confronting surface S of the head from the support surface such as a work bench, the length of the foot between support surface 16 and the base 15 should be at least about 1 inch, and desirably about 1.5 inches.

The foot 12 may be solid or, to conserve material, may be partially hollowed out, as with a hole 17 about 0.5 inch in diameter and 0.75 inch long. Finally, the foot may be cylindrical in shape as described, or may be polygonal. The important thing is that the size and shape of the foot 12 is such that the upper support surface 16 be shaped to bear against the surface of the head around a bolt hole with sufficient surface area to stably support the head H to space it away from a support surface, thereby to protect the engine head H, its surfaces, and any projecting parts from damage.

The retainer 14 of the support member 10 projects upwardly from the foot support surface 16 which surrounds it. Desirably retainer 14 is centrally located on the surface 16.

Retainer 14 comprises a plurality of deflectable spring fingers 18 which are formed integrally with the foot 12 at foot surface 16, which flare upwardly and outwardly therefrom from a base dimension to a major outer retainer dimension provided by outer finger portions on flats 20, and which then flare upwardly and inwardly to a reduced dimension portion at which the fingers merge into an integral crown 22.

The major outer retainer dimension at the outer portions or flats 20 is substantially less than the diameter of foot 12 and may be about 0.6 inch which is larger than the diameter of the largest bolt size used for clamping typical automobile internal combustion engine blocks and heads together. The size of the outer dimension is chosen so that it is preferably universal to bolt hole sizes used for such engines, so that a member 10 will be resiliently retained in a bolt hole, all for ease of handling, movement and support of the engine head.

The dimension of the crown 22 is such that it is smaller than the size of the bolt holes B. As such it provides for easy entry of the retainer 14 into a bolt hole B which, as the retainer is pushed therein to, eventually contacts the sides of the bolt hole via fingers 18 intermediate the crown 22 and flats 20. Because of the substantial slope of the fingers 18 relative to the bolt hole B, the upper intermediate portions of the fingers easily cam the retainer 14 of the member 10 into the bolt holes until the head H is seated against the surface 16 of foot 12. For this purpose, the angle between the inclined finger elements and the plane of surface 16 (and planes parallel thereto) is about 70°. Desirably the overall length of the retainer 14 is about 1.12 inches. The thickness of the fingers 18 is about 0.1 inch and their width is about 0.3 inch.

Desirably the support members 10 are non-metallic and are integrally molded of plastic or of a relatively hard rubber. Typical suitable materials are nylon, polyproprylene, and a hard rubber, such as neoprene rubber.

The method of the invention contemplates the use of a plurality of the engine head support members by inserting the retainers in a plurality of spaced-apart head bolt holes, pushing them home until their upper foot surfaces contact the head surface, and then positioning the assembled head and support members on a support surface. The deflectable fingers of the retainers are retained by the bolt holes, making use of the support members quite easy. When the head is to be reassembled to the block the support members are simply removed, and may be thrown away or used again. Desirably support members are dimensioned to be universal to bolt holes of the range of sizes conventionally used by engine manufacturers.

From the foregoing, it will be apparent to those skilled in the art that modifications may be made without departing from the spirit and scope of the invention. As such it is intended that the invention is to be limited only as may be made necessary by the claims appended hereto.

What is claimed is:

1. An engine head support member comprising a foot and a retainer, said foot having a base for supporting said member on a horizontal surface and an upper surface for supporting the block confronting surface of an internal combustion engine head thereagainst, the length of said foot being at least one inch, said upper surface being of a size substantially greater than the diameter of bolt holes in an engine head, said retainer comprising a plurality of deflectable fingers extending upwardly and outwardly from said upper surface generally centrally thereof from a first reduced dimension thereof to a second greater major outer dimension which is larger than the diameter of bolt holes in an engine head, and then which reduces in size upwardly and inwardly to an outer reduced dimension portion which is less than the diameter of bolt holes in an engine head, said outer reduced dimension portion being insertable into a said bolt hole so that said retainer may be firmly seated and retained in a bolt hole, and wherein said foot and retainer are integrally molded and said fingers merge in a crown at said outer reduced dimension portion.

2. The engine head support member of claim 1, and wherein said foot is generally cylindrical in external configuration and said support member is non-metallic.

3. The engine head support member of claim 1, and wherein said retainer tapers upwardly and inwardly to said outer reduced dimension portion.

4. A method of temporarily supporting an internal combustion engine head to prevent damage at its block confronting surface, said engine head defining a plurality of bolt holes, said method comprising the steps of providing a plurality of engine head support members, each head support member comprising a foot and a retainer, said foot having a base and upper surface and a length between them of at least about one inch, said upper surface being of a size which is substantially greater than the diameter of said bolt holes, said support member retainer projecting upwardly from said foot upper surface and comprising a plurality of deflectable fingers which flare upwardly and outwardly from a base dimension less than the diameter of said bolt holes to a major outer dimension which is greater than the diameter of said bolt holes and which then reduces in size upwardly and inwardly therefrom to an upper reduced dimension portion which is less than the diameter of said bolt holes, inserting said upper reduced dimension portions of a plurality of said support members into a plurality of said bolt holes and forcing them inwardly thereof until each foot upper surface engages an adjacent block confronting surface of said engine head around a bolt hole, whereby said support members are firmly secured to and retained by said bolt holes, and then positioning the support members on a support surface to stably support the block confronting surface spaced away from said support surface, and wherein each said support member is integrally molded, and said fingers of each merge upwardly into a crown to form said upper reduced dimension portion.

5. A method of temporarily supporting an internal combustion engine head as set forth in claim 4, and wherein said support members are non-metallic and said feet are generally cylindrical in external configuration.

6. The method of temporarily supporting an internal combustion engine head as set forth in claim 4, and wherein said retainer tapers upwardly and inwardly to said outer reduced dimension portion.

* * * * *